(No Model.)
J. OLSON.
AXLE LUBRICATOR.
No. 518,157. Patented Apr. 10, 1894.
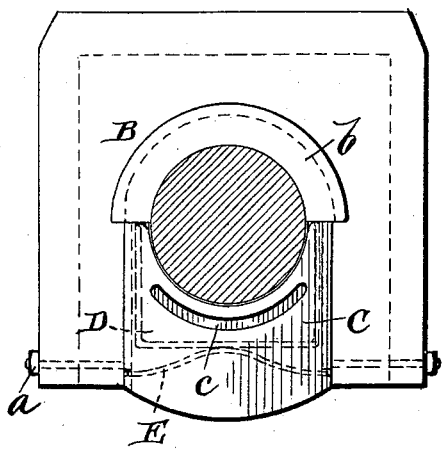
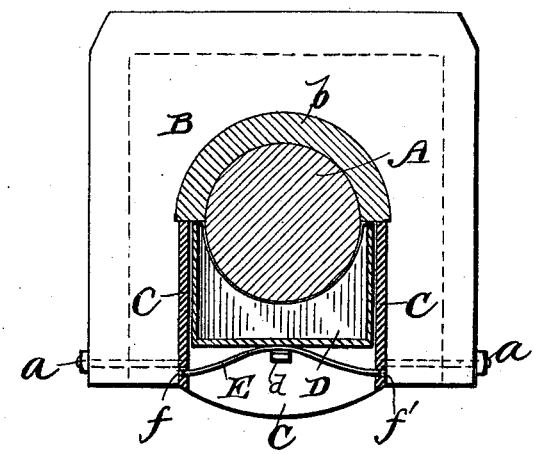
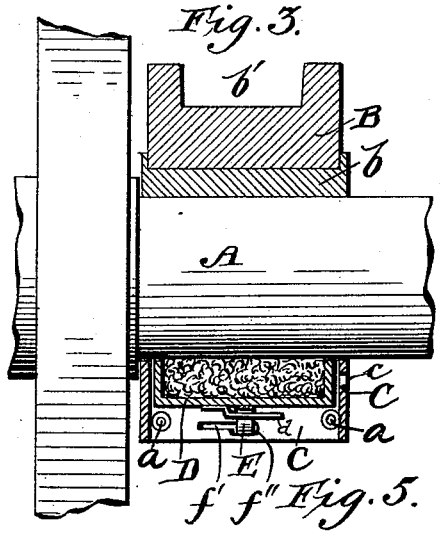
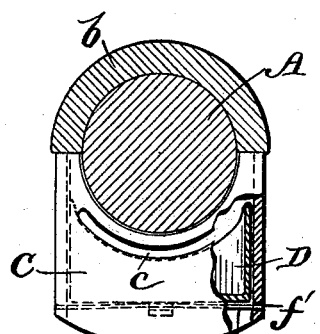
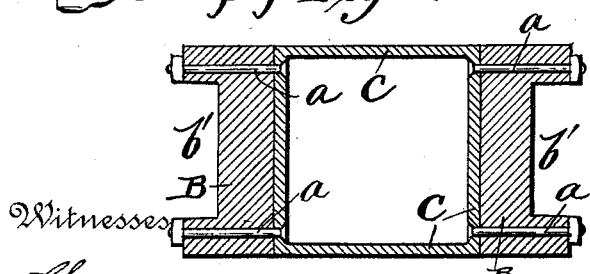
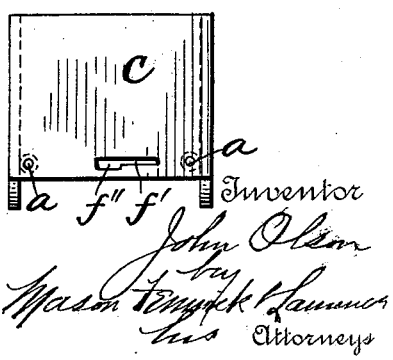
Witnesses
Severance
W Harvey Huzzy
Inventor
John Olson
by
Mason Fenwick Lawrence
his Attorneys

UNITED STATES PATENT OFFICE.

JOHN OLSON, OF TWO HARBORS, MINNESOTA.

AXLE-LUBRICATOR.

SPECIFICATION forming part of Letters Patent No. 518,157, dated April 10, 1894.

Application filed December 23, 1893. Serial No. 494,570. (No model.)

*To all whom it may concern:*

Be it known that I, JOHN OLSON, a citizen of the United States, residing at Two Harbors, in the county of Lake and State of Minnesota, have invented certain new and useful Improvements in Axle-Lubricators; and I do hereby declare the following to be a full, clear, and exact description of the invention, such as will enable others skilled in the art to which it appertains to make and use the same.

My invention relates to improvements in axle lubricators and has more especially to do with lubricating the axles of the driving wheels of locomotive engines and the objects of the invention are to secure perfect lubrication of the said axles by devices which will bring the lubricant in direct contact with the axles at all times, and also to provide devices into which the lubricant and packing can be introduced or replenished with a minimum of time and labor. I accomplish these objects by the devices described and illustrated in the following specification and the accompanying drawings, in which latter—

Figure 1. represents an end elevation of the devices embodying my invention, the cellar and spring being shown in dotted lines. Fig. 2. represents a transverse central vertical section through said devices. Fig. 3. represents a longitudinal central vertical section through said devices. Fig. 4. represents an end elevation, partly broken away, to show the interior, of the devices embodying my invention the cellar for containing the asbestus packing and lubricant being in its lowered position with the supporting spring flattened out. Fig. 5. represents a horizontal section through the cellar casing showing the bolts for attaching it to the journal box, and Fig. 6. represents a side elevation of the cellar casing showing one of the slots for receiving the end of the supporting spring.

A in the drawings, represents the axle or journal carrying the wheels of the locomotive. B the journal box provided with the segmental bearing portion $b$ which is secured within the upper portion of the same so as to allow the journal A to be inserted below it.

The bearing box B is provided upon its upper surface and sides with grooves $b'$ within which the frame of the truck is secured. Within this bearing box below the journal is rigidly secured a casing C by means of four short bolts $a$ which pass through the journal box and engage the same. This casing has its top cut away on the opposite ends so as to leave segmental recesses in the same; these recesses being of such diameter as to allow the said casing to fit snugly up about the lower half of the journal as shown in Figs. 1 and 4. The outer end of the casing C is provided at a suitable distance below its top, with a segmental slot $c$ for allowing the introduction of oil and packing material into a movable cellar D mounted in said casing by means of a supporting spring E which engages the bottom of the said cellar and thereby forces it upward against the journal; the ends of said spring being loosely mounted in slots $f, f'$ in said casing C. The slot $f'$ is much longer than the slot $f$ and is provided with a depression $f''$ into which the spring fits when in its normal position. When it is desired to remove the spring, the end in the depression $f''$ is raised and slid along the slot $f'$ until it assumes a diagonal position when it can be removed through the open bottom of the casing. The depression $f''$ is for the purpose of keeping the spring in its normal position under the cellar. The top of the cellar is constructed to surround the lower half of the journal in the same manner as the casing C. A catch or handle $d$ is attached to the bottom of the cellar D so that the spring E passes between it and the bottom of the cellar and the spring is thus kept in position; the catch at the same time acting as a handle to be grasped when it is desired to lower the cellar by compressing the spring E, see Fig. 4, so as to be able to introduce oil or asbestus packing into the cellar through the segmental slot $c$.

It will be seen from the foregoing description that the spring will always keep the cellar D which is filled with asbestus packing and lubricant, up against the lower half of the journal, see Fig. 2, and at the same time will allow the cellar to be depressed sufficiently to permit of additional packing or lubricant being introduced from above through the segmental slot $c$, see Fig. 4, so that it is not necessary to remove the cellar for the purpose of supplying additional lubricant, but it may be removed when necessary for cleaning or other purposes, in which case the spring is slipped out altogether as before described, thus allowing the cellar to be drawn out through the open bottom of the casing.

I contemplate in some instances extending the bolts *a* through the cellar casing and thus having two instead of four bolts, and resting the ends of the springs on said bolts; said ends being turned under slightly so as to hold firmly on said bolts.

In some locations of journal boxes it is more convenient to use a spiral spring to support the cellar in lieu of the flat spring. When this spiral spring is used a supporting bar connected to the journal box is provided so as to support the spring below the center of the cellar. The cellar and the supporting bar in this case are provided with studs about which the ends of the spring are fitted and the spring thus held in position.

What I claim as my invention is—

1. In an axle lubricator, the combination with a journal box, of a rigid casing mounted within the same and provided with a long continuous slot in its wall for the introduction of waste, a vertically movable cellar mounted in said casing and adapted to be depressed below said slot for the introduction of said waste through said slot into it, and a spring for holding the cellar and the lubricant and waste carried thereby in contact with the journal, substantially as described.

2. In an axle lubricator, the combination with a journal box of a rigid casing mounted within the same and provided with a slot for the introduction of lubricating material and also with spring holding slots one of which is provided with a spring retaining depression, a movable cellar mounted in said casing, a removable spring for supporting said cellar normally in contact with the journal; said spring having its ends mounted in said spring holding slots, substantially as described.

In testimony whereof I hereunto affix my signature in presence of two witnesses.

JOHN OLSON.

Witnesses:
H. O. OLSON,
CHARLES M. FLOATHE.